United States Patent [19]

Yonezawa

[11] Patent Number: 4,984,071

[45] Date of Patent: Jan. 8, 1991

[54] METHOD OF AND APPARATUS FOR ESTABLISHING A REFERENCE POINT ON A GRADATION CORRECTION CURVE

[75] Inventor: Yasuharu Yonezawa, Kyoto, Japan

[73] Assignee: Dainippon Screen Mfg. Co., Ltd., Japan

[21] Appl. No.: 446,395

[22] Filed: Dec. 5, 1989

[30] Foreign Application Priority Data

Dec. 9, 1988 [JP] Japan .................. 63-312684

[51] Int. Cl.$^5$ .............................. H04N 1/46
[52] U.S. Cl. .......................... 358/80; 358/75
[58] Field of Search .................. 358/75, 79, 80

[56] References Cited

U.S. PATENT DOCUMENTS 4,899,216 2/1990 Yonezawa .................. 358/75

Primary Examiner—Howard W. Britton
Assistant Examiner—Tuan V. Ho
Attorney, Agent, or Firm—Ostrolenk, Faber, Gerb.& Soffen

[57] ABSTRACT

A highlight point ($HL_R$, $HL_G$, $HL_B$) and/or a shadow point ($SD_R$, $SD_G$, $SD_B$) on a gradation correction curve are established in consideration of decoloration and color fog of an original. Density values of respective primary colors are obtained for each pixel on an original. Average density is computed for each pixel and a cumulative histogram of average density distribution is generated. Temporary reference density values corresponding to prescribed cumulative frequencies are found on the cumulative histogram. Reference color density values ($D_{RH}$, $D_{GH}$, $D_{BH}$) are computed by averaging the density of each color for the pixels having average density between the temporary reference density and terminal density on the cumulative histogram. The highlight and shadow points are specified with one of the reference color density values.

15 Claims, 9 Drawing Sheets

METHOD OF AND APPARATUS FOR ESTABLISHING A REFERENCE POINT ON A GRADATION CORRECTION CURVE

BACKGROUND OF THE INVENTION

1. Field of the Invention

The present invention is related to a method of and an apparatus for establishing a reference point, that is, a highlight point and/or a shadow point, on gradation correction curve which is employed in gradation correction of image data.

2. Description of Background Art

A color scanner usually comprises a gradation correction unit for performing gradation correction on image data of an original image (or an image to be reproduced) having gradations in tone.

The gradation correction is performed according to a gradation correction curve. An operator sets up the gradation correction curve in the color scanner by selecting a highlight point and a shadow point on the original image, and by inputting into the color scanner density values of the highlight and shadow points for highlight and shadow density values) and halftone-dot area rates corresponding to respective highlight and shadow density values. Because the highlight and shadow points are selected only by the operator's judgement, the skill of the operator affects the quality of a reproduced image. In order to cope with this problem, several methods of automatically setting up the gradation correction curve have been proposed as follows.

Japanese Patent Laying Open Gazette No. 60-87594 discloses the following method: A brightness signal is obtained by adding up color-component signals R, G and B of a selected image point while weighting the color-component signals, respectively. A cumulative histogram of the values of the brightness signal is then prepared. On this cumulative histogram, the upper limit value (or highlight density) and the lower limit value (or shadow density) of the brightness signal are obtained corresponding to respective predetermined cumulative frequencies, such as 1% and 99%. Each of color-component signals R, G and B of an image is normalized with the upper and lower limit values in the gradation correction operation.

Japanese Patent Laying Open Gazette No. 60-87595 discloses a method in which the upper and lower limit values are obtained for each of the color-component signals R, G and B while the cumulative histogram is prepared for each of the color-component signals.

Japanese Patent Laying Open Gazette No. 62-11570 discloses a method in which highlight and shadow density values are obtained for each of the color-component signals R, G, and B while the cumulative histogram is prepared for each of the color-component signals on the basis of an image signal obtained by preliminary scanning of an image.

In the above methods, the highlight and shadow density values are related to predetermined cumulative frequencies, such as 1% and 99%, respectively. Accordingly, if the original image is discolored or has color fog, the color tone of a reproduced image becomes similar to that of the original so as to seem unnatural.

SUMMARY OF THE INVENTION

The present invention is directed to a method of and an apparatus for establishing reference point on a gradation curve employed in gradation correction of image data. The method comprises the steps of: (a) preparing image data representing density values of a plurality of basic colors with respect to each pixel in an original; (b) averaging the density values of respective basic colors with respect to each pixel to obtain average density $D_M$ of each pixel; (c) generating a histogram representing average density distribution in the form of a relation between the average density $D_M$ and a number of pixels $N_p$; (d) generating a cumulative histogram representing the average density distribution in the form of a relation between the average density $D_M$ and a cumulative number of pixels RN; (e) finding a reference average value of a reference cumulative number of pixels $RN_{rf}$ on the cumulative histogram; (f) selecting one of two terminal density values $D_{Mm}$ at which the cumulative histogram saturates and which is closer to the reference average density; (g) finding a set of pixels having an average density in a range essentially between the reference average density $D_{Mrf}$ and a selected terminal density value $D_{Mm}$; (h) averaging the density values of the plurality of basic colors for the set of pixels with respect to each of the plurality of basic colors, to thereby obtain reference color density values $D_{rf}$ for respective basic colors; and (i) establishing the reference point on the basis of the reference color density values $D_{rf}$.

According to an aspect of the invention, the gradation correction curve is defined on a coordinate plane whose first coordinate represents a first density DI before gradation correction and whose second coordinate represents a second density DO after gradation correction, and the gradation correction curve is drawn through a reference point specified with one of the reference color density values $D_{rf}$ as the first coordinate and a prescribed value $DO_{rf}$ as the second coordinate.

Preferably, a gradation correction curve is generated for each of the plurality of basic colors.

The plurality of basic colors may essentially consist of primary colors.

The reference point may be either of a highlight point or a shadow point, and at least one of the highlight point and the shadow point may be established by the mentioned steps (a) through (i).

The reference point for each of the plurality of basic colors may be specified with one of the reference color density values $D_{rf}$ for a corresponding color as the first coordinate. Instead the reference point for each of the plurality of basic color may be specified with the largest value among the reference color density values $D_{rf}$ as the first coordinate. Further, the reference point for each of the plurality of basic colors may be specified with the smallest value among the reference color density values $D_{rf}$ as the first coordinate.

Accordingly, an object of the present invention is to easily establish proper highlight and/or shadow points on a gradation correction curve.

Another object of the present invention is to establish proper highlight and/or shadow points on a gradation correction curve while compensating for the discoloration of color fog of an original image.

These and other objects, features, aspects and advantages of the present invention will become more apparent from the following detailed description of the present invention when taken in conjunction with the accompanying drawings.

RELATIONSHIP BETWEEN SYMBOLS

In the following description of preferred embodiments, various symbols expressing mathematical or physical quantities are used in order to clarify the quantitive character of the preferred embodiment. However, the symbols in the preferred embodiment are different from those used in the section of "SUMMARY OF THE INVENTION" and in the appended claims. This is because the symbols in the preferred embodiments are so provided as to express the quatities under embodied conditions, while those in the claims are provided for representing a global concept. For reference, the relationship or correspondence between these symbols are listed in Table 1.

TABLE 1

| Claims | Preferred Embodiments |
|---|---|
| $D_M$ | $D_M$, $D_{Mi}$ |
| $D_{Mm}$ | $D_{Mmin}$, $D_{Mmax}$ |
| $D_{Mrf}$ | $D_{MH}$, $D_{MS}$ |
| $D_{rf}$ | $D_{RH}$, $D_{GH}$, $D_{BH}$, $D_{RS}$, $D_{GS}$, $D_{BS}$ |
| $D_I$ | DI |
| $D_O$ | DO |
| $DO_{rf}$ | $DO_{HL}$, $DO_{SD}$ |
| $N_p$ | $N_p$ |
| RN | RN |
| $RN_{rf}$ | $RN_H$, $RN_S$ |

DESCRIPTION OF THE PREFERRED EMBODIMENTS

Figure 1A:
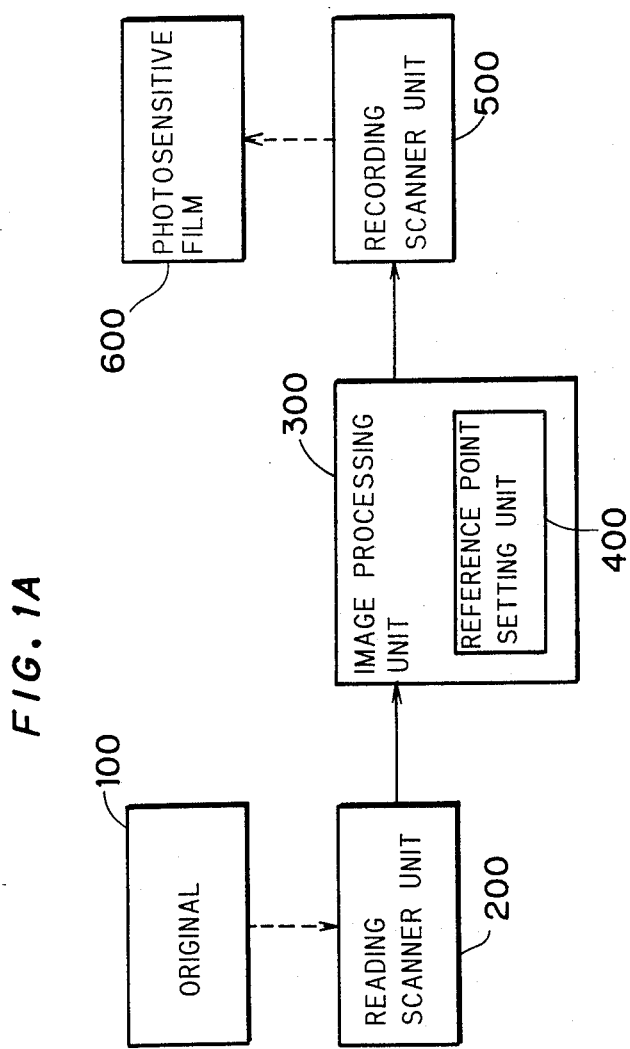
FIGS. 1A and 1B are block diagrams showing the structure of a color scanner according to a preferred embodiment of the present invention.

FIG. 1A is a block diagram showing the structure of a color scanner according to a preferred embodiment of the present invention.

In FIG. 1A an original 100 is read by a reading scanner unit 200 with respect to each pixel. An image signal obtained by reading the original 100 is transmitted from the reading scanner unit 200 to an image processing unit 300. The image processing unit comprises a reference point setting unit 400. The reference point setting unit 400 has a function to establish highlight and shadow points on a gradation correction curve. An image signal processed by the image processing unit 300 is supplied to a recording scanner unit 500. The recording scanner unit 500 converts the image signal into a halftone dot signal and exposes a photosensitive film 600 according to the halftone dot signal, thereby producing a halftone image.

Figure 1B:
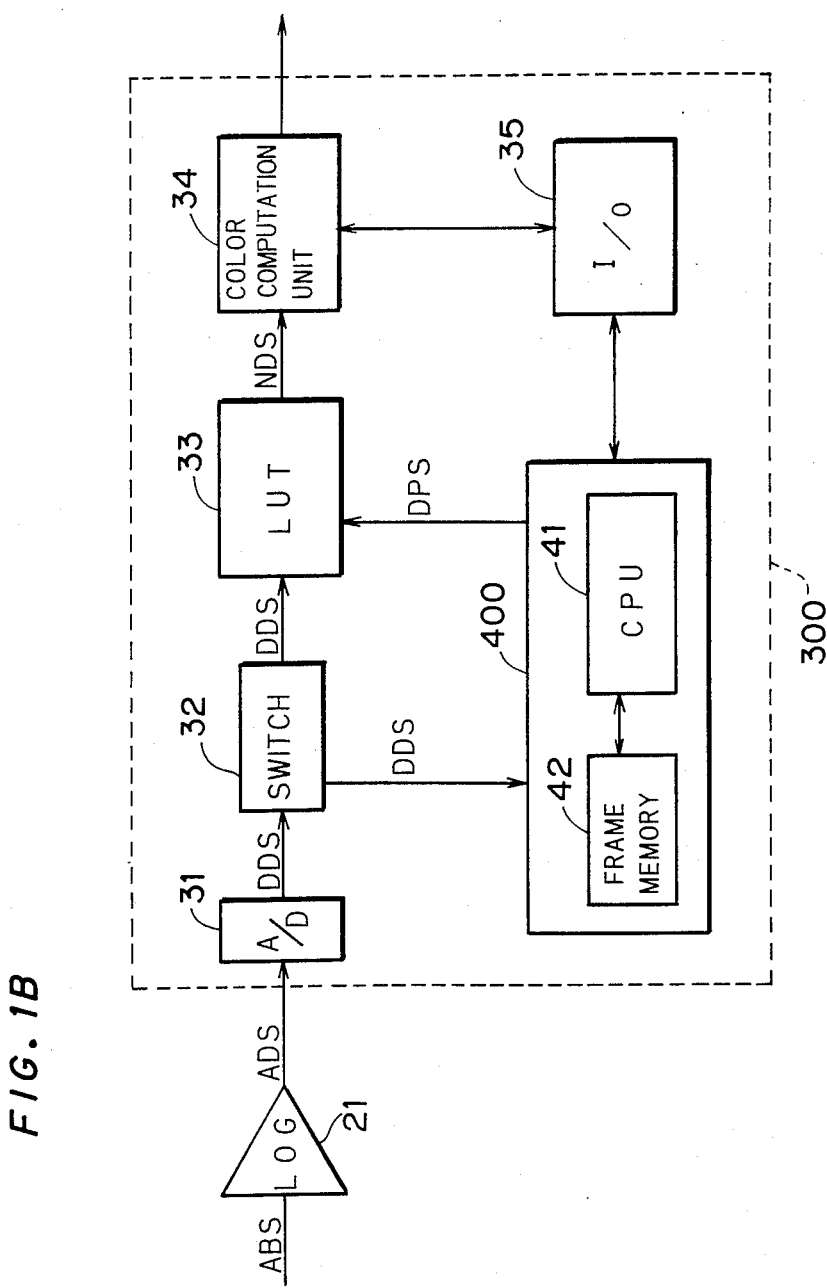

FIG. 1B is a block diagram showing internal structure mainly of the image processing unit 300 and of the included reference point setting unit 400.

The reading scanner unit 200 of FIG. 1A scans the original 100 and produces an analog luminance signal ABS (FIG. 1B). The reading scanner unit 200 further converts the analog luminance signal ABS into an analog density signal ADS by a logarithmic amplifier 21 (FIG. 1B) provided in the reading scanner unit 200.

The analog density signal ADS is supplied to an A-D converter 31 (FIG. 1B) in the image processing unit, thereby being converted into an uncorrected digital density signal DDS representing primary color density values with respect to each pixel. The uncorrected digital density signal DDS from the A-D converter 31 is supplied to a switch 32.

In a preliminary scanning operation for setting up the highlight and shadow points, the switch 32 connects the A-D converter 31 and the reference point-setting unit 400 to supply the uncorrected digital density signal DDS to the latter. The reference point-setting unit 400 comprises a CPU 41 for controlling the entirety of the image processing unit 300 and a frame memory 42 for storing given image data or the like. The reference point-setting unit 400 performs processing of the uncorrected digital density signal DDS, whose content will be described later, to generate a density parameter signal DPS representing coordinates of highlight and shadow points on a gradation correction curve. The density parameter signal DPS is supplied to a look-up table (or LUT) 33 to modify a gradation correction curve stored therein.

In ordinary scanning operation, the switch 32 connects the A-D cOnverter 31 and the LUT 33 to supply the uncorrected digital density signal DDS to the latter. The LUT 33 converts the uncorrected digital density signal DDS into a normalized digital density signal NDS according to a gradation correction curve stored in the LUT 33. The normalized digital density signal NDS represents primary color density values normalized by the gradation correction curve in the LUT 33. The normalized digital density signal NDS is supplied to a color computation unit 34. The color computation unit 34 performs on the signal NDS several kinds of color computation, such as color correction, undercolor removal (UCR), detail enhancement and the like, according to instructions provided by an I/O unit 35 comprising a CRT, a keyboard and the like (not shown). An operator specifies conditions of the color computation with the I/O unit 35. The CRT displays the conditions, such as color condition, and enables the operator to confirm the same. The I/O unit 35 can exchange some data concerning the setting-up of the highlight and shadow points with the reference point setting unit 400.

Figure 2A:
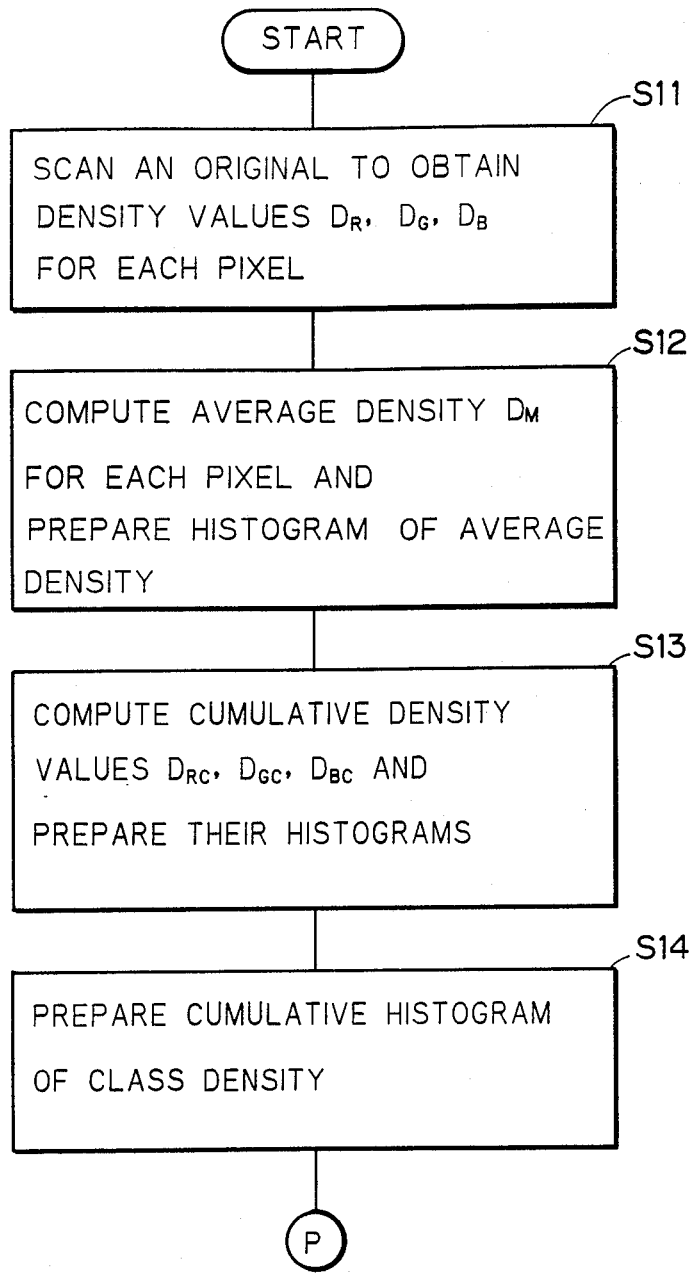
FIGS. 2A and 2B are flow charts showing the procedure of preparing for setup of a color scanner.
Figure 2B:
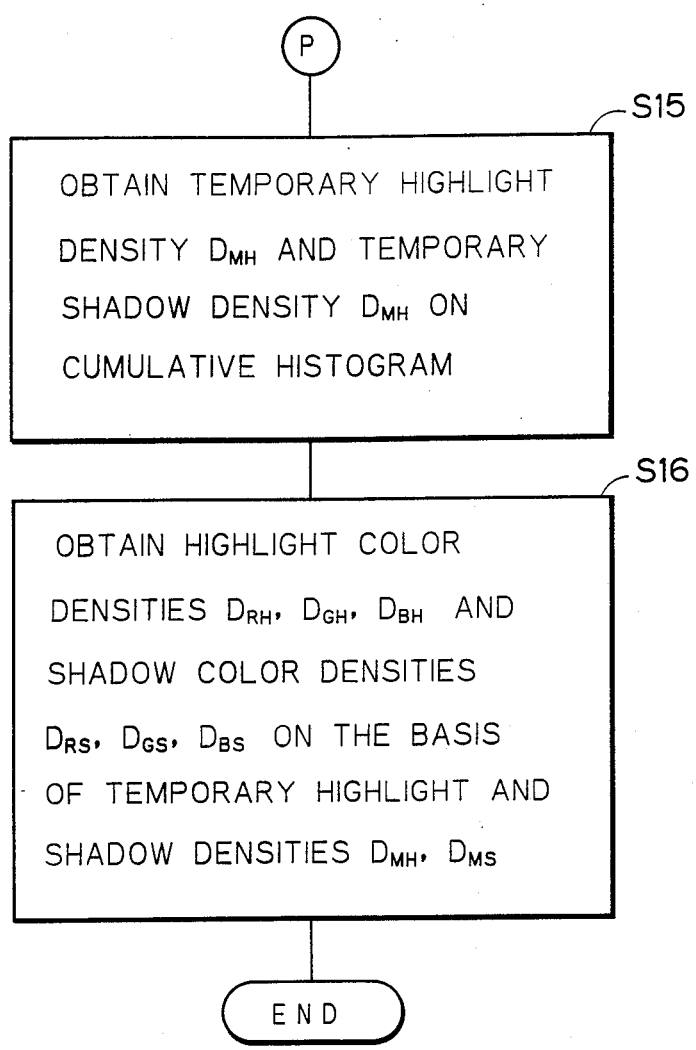

FIGS. 2A and 2B are flow charts showing the procedure of preparation for setup of the gradation correction curve.

At a step S11, the reading scanner unit 200 scans the original 100 to obtain density values $D_R$, $D_G$ and $D_B$ for respective color components R, G and B with respect to each pixel sampled. These density values $D_R$, $D_G$ and $D_B$ are supplied to the image processing unit 300 in the form of the analog density signal ADS (see FIG. 1B), and stored in the frame memory 42 after analog-digital conversion by the A-D converter 31. The following steps are performed in the reference point-setting unit 400.

Figure 3:
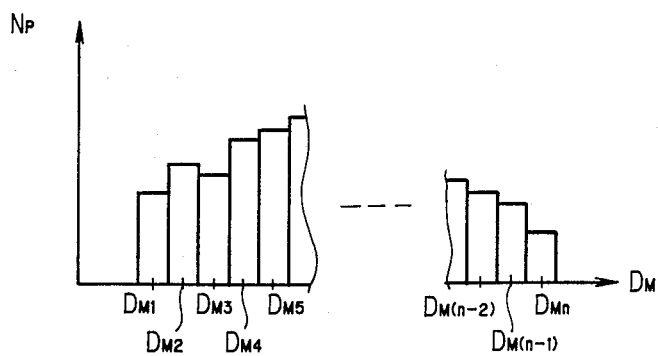
FIG. 3 is a graph showing a histogram of average density over three color components at each pixel.

At a step S12, average density $D_M = (D_R + D_B + D_G)/3$ is computed from the density values $D_R$, $D_B$ and $D_G$ with respect to every pixel subjected to scanning at the step S11. A histogram of the average density $D_M$ is prepared as shown in FIG. 3. The axis of abscissa of the graph is the average density $D_M$ divided into class intervals. Each class has a mean value $D_{Mi}$, where i is an integer from 1 to n, as shown in FIG. 3. The axis of ordinate of the graph is the number of pixels $N_p$. All the pixels scanned are classified into the class intervals. A part of the graph between the classes having the mean values $D_{M6}$ and $D_{M(n-3)}$ is omitted for convenience of illustration.

Figure 4A:
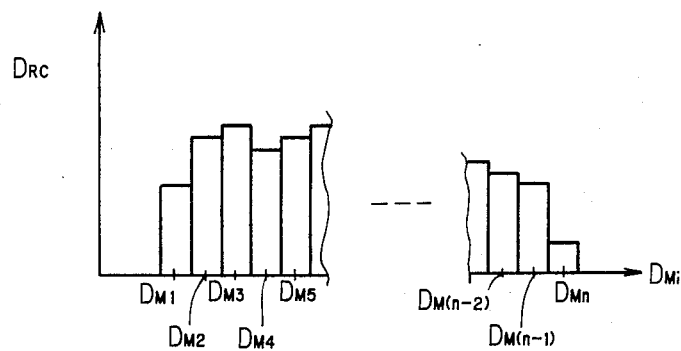
FIGS. 4A through 4C, 6A through 6C and 7A through 7C are graphs showing histograms of cumulative density values.
Figure 4B:
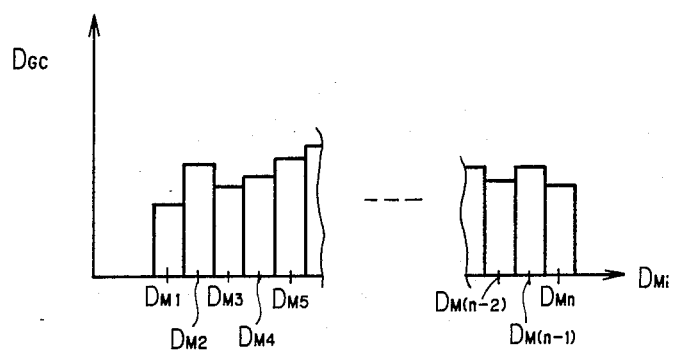
Figure 4C:
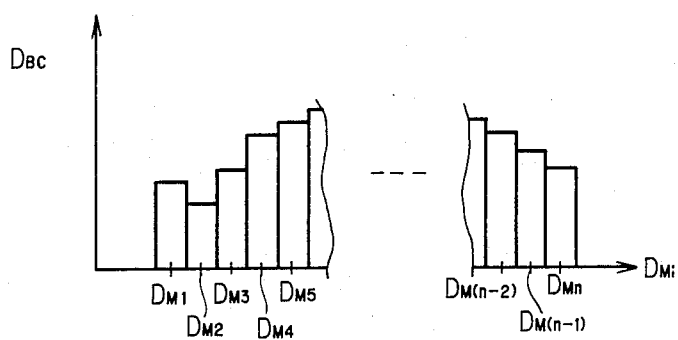

At a step S13, histograms shown in FIGS. 4A, 4B and 4C are prepared. FIG. 4A illustrates a histogram of cumulative density value $D_{RC}$ of red color. With respect to every class in FIG. 3, the density value $D_R$ of the red color is acumulated for all the pixels included in a same class, whereby the cumulative density value $D_{RC}$ is obtained for each class. The axis of abscissa of the graph is the average density $D_M$ divided into the class intervals. The mean value $D_{Mi}$ of each class will be hereinafter referred to as "class value". The axis of ordinate of the graph is the cumulative density value $D_{RC}$. Cumulative density values $D_{GC}$ and $D_{BC}$ of respective color components G and B are also obtained with respect to every class, whereby the histograms shown in FIGS. 4B and 4C are prepared.

An example of the procedure at the step S13 is as follows: Suppose that each class has an interval of 0.1 in units of density. Let us consider the class having the class value $D_{Mi}$ of 1.0, where the average density $D_M$ satisfies $0.95 \leq D_M < 1.05$. Now assume that the class includes only three pixels PX1-PX3 and the density of the three pixels PX1-PX3 are as follows:

PX1: $D_R=0.95$, $D_G=0.90$, $D_B=1.10$, $D_M=0.98$
PX2: $D_R=0.90$, $D_G=1.10$, $D_B=1.00$, $D_M=1.00$
PX3: $D_R=0.95$, $D_G=0.95$, $D_B=1.00$, $D_M=0.97$

The cumulative density value $D_{RC}$ of this class $(0.95 \leq D_M < 1.05)$ is computed as:

$$D_{RC}=0.95+0.90+0.95=2.80$$

The cumulative density values $D_{GC}$ and $D_{BC}$ are computed similarly as:

$$D_{GC}=0.90+1.10+0.95=2.95$$

$$D_{BC}=1.10+1.00+1.00=3.10$$

These calculations are performed with respect to every class to obtain the histograms for respective color components R, G and B.

Figure 5:
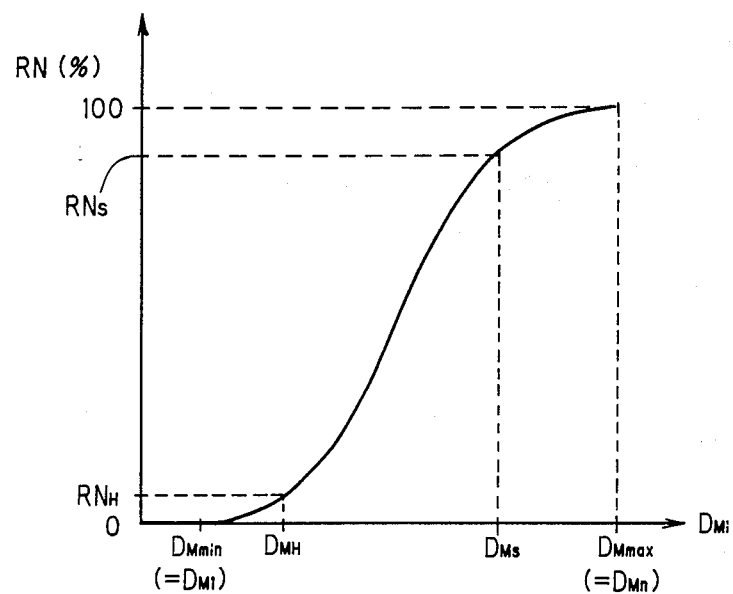
FIG. 5 is a graph showing a cumulative histogram of class density.

At a step S14, a cumulative histogram of the class density $D_{Mi}$ is prepared as shown in FIG. 5. The axis of abscissa of the graph is the class density $D_{Mi}$ (i = 1 to n). The axis of ordinate of the graph is relative cumulative frequency RN of pixel in percents. The relative cumulative frequency RN is a rate of cumulative frequency obtained by adding the number of pixels $N_p$ from a minimum class density $D_{Mmin}$ to a particular class density $D_{Mi}$ to overall cumulative frequency. In FIG. 6, the minimum class density $D_{Mmin}$ is equal to $D_{M1}$, and the maximum class density $D_{Mmax}$ is equal to $D_{Mn}$. In general, the minimum and maximum class density values $D_{Mmin}$ and $D_{Mmax}$ can be between the class density values $D_{M1}$ and $D_{Mn}$ which define both ends of the entire density range. The cumulative histogram of FIG. 5 shows the value of the relative cumulative frequency RN ranging from 0% to 100% within a range from the minimum class density $D_{Mmin}$ to the maximum class density $D_{Mmax}$. Assuming that the class interval is small, the cumulative histogram can be approximated to the curve shown in FIG. 5.

At a step S15 (FIG. 2B), a temporary highlight density $D_{MH}$ and a temporary shadow density $D_{MS}$ are obtained on the cumulative histogram of FIG. 5. First, values of relative cumulative frequencies $RN_H$ and $RN_S$, which correspond to the highlight and shadow points on the gradation correction curve, respectively, are empirically determined in advance so that they may indicate proper values of the highlight and shadow density values which will make an optimum gradation correction curve. The relative cumulative frequencies $RN_H$ and $RN_S$ are determined on the basis of experience of processing many originals, for example. The temporary highlight density $D_{MH}$ and the temporary shadow density $D_{MS}$ correspond to the relative cumulative frequencies $RN_H$ and $RN_S$, respectively, on the cumulative histogram as shown in FIG. 5. The values of the relative cumulative frequencies $RN_H$ and $RN_S$ are about 1% and 98%, respectively, for example.

Figure 6A:
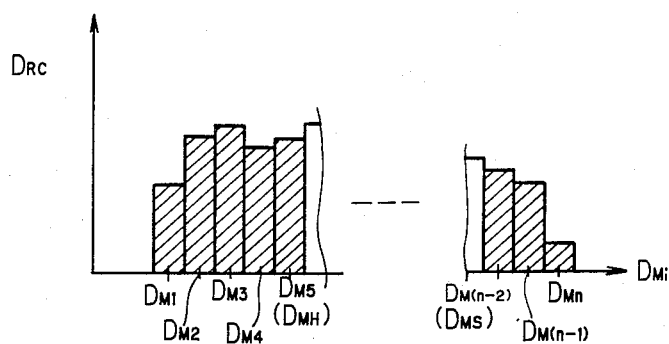
Figure 6B:
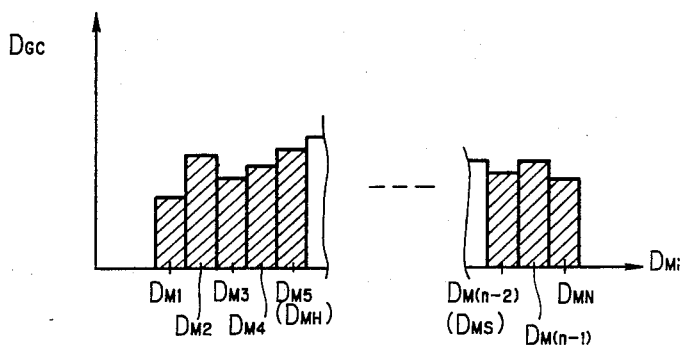
Figure 6C:
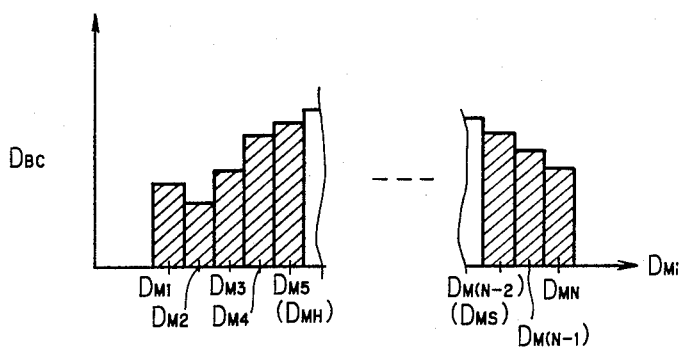

At a step S16, highlight color density values $D_{RH}$, $D_{GH}$ and $D_{BH}$ and shadow color density values $D_{RS}$, $D_{GS}$ and $D_{BS}$ for respective color components R, G and B are obtained on the basis of the temporary highlight density $D_{MH}$, the temporary shadow density $D_{MS}$ and the histograms of FIGS. 4A through 4C. FIGS. 6A through 6C are graphs equivalent to FIGS. 4A through 4C, where some rectangles are shaded. The shaded rectangles correspond to the classes whose class density $D_{Mi}$ is no more than the temporary highlight density $D_{MH}$ ($D_{Mmin} \leq D_{Mi} \leq D_{MH}$) or no less than the temporary shadow density $D_{MS}$ ($D_{MS} \leq D_{Mi} \leq D_{Mmax}$). The temporary highlight density $D_{MH}$ is equal to the class density $D_{M5}$, and the tempOrary shadow density $D_{MS}$ to the class density $D_{M(n-2)}$ in FIGS. 6A through 6C. The highlight color density $D_{RH}$ is obtained as follows, for example: First, the cumulative density value $D_{RC}$ ($D_{R1}$, $D_{R2}$, $D_{R3}$, $D_{R4}$, $D_{R5}$) of the classes having the class density from $D_{M1}$ to $D_{M5}$ are added. On the other hand, the number of pixels $N_p$ ($N_{p1}$, $N_{p2}$, $N_{p3}$, $N_{p4}$, $N_{p5}$) of the same classes are added. The highlight color density $D_{RH}$ is computed as follows:

$$D_{RH}=(D_{R1}+D_{R2}+D_{R3}+D_{R4}+D_{R5})/(N_{p1}+N_{p2}+N_{p3}+N_{p4}+N_{p5}) \qquad (1)$$

other words, the highlight color density $D_{RH}$ is the average density of the red color pixels included in the classes whose class density is no more than the temporary highlight density $D_{MH}$. The shadow color density $D_{RS}$ is similarly computed as follows:

$$D_{RS}=(D_{R(n-2)}+D_{R(n-1)}+D_{Rn})/(N_{p(n-2)}+N_{p(n-1)}+N_{pn}) \qquad (2)$$

where $D_{R(n-2)}$ to $D_{Rn}$ are cumulative density values of the red color for the classes having the class density values $D_{M(n-2)}$, $D_{M(n-1)}$ and $D_{Mn}$, respectively, and $N_{p(n-2)}$, $N_{p(n-1)}$ and $N_{pn}$ are the numbers of pixels for those classes. The highlight color density values $D_{GH}$ and $D_{BH}$ and the shadow color density values $D_{GS}$ and $D_{BS}$ for the color components G and B are obtained similarly. The highlight color density values $D_{RH}$, $D_{GH}$ and $D_{BH}$ and the shadow color density values $D_{RS}$, $D_{GS}$ and $D_{BS}$ obtained above are stored in the frame memory 42.

The procedure of the setup of the gradation correction curves is finished at the end of the step S16.

The setup of the gradation correction curves is performed with the highlight color density values $D_{RH}$, $D_{GH}$ and $D_{BH}$ and the shadow density values $D_{RS}$, $D_{GS}$ and $D_{BS}$. An operator can select one of the three procedures described below according to the color tone and other conditions of the original to be processed.

A first procedure is suitable for processing an original that has a shadow area and a highlight area in it apparently and is covered with color fog (or shifted to a particular hue). In the first procedure, the highlight color density values $D_{RH}$, $D_{GH}$ and $D_{BH}$ and the shadow color density values $D_{RS}$, $D_{GS}$ and $D_{BS}$ are employed to represent density values of highlight and shadow points that are set for respective color components on the gradation correction curve.

Figure 7A:
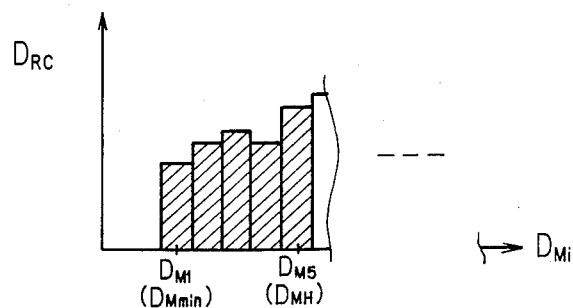
Figure 7B:
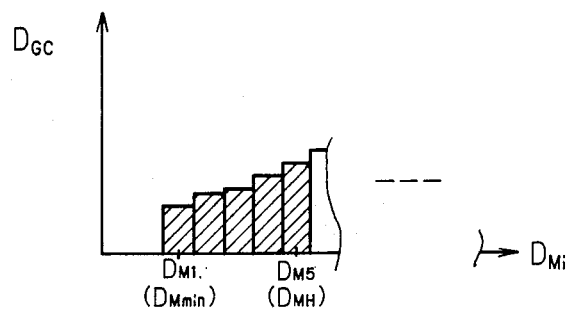
Figure 7C:
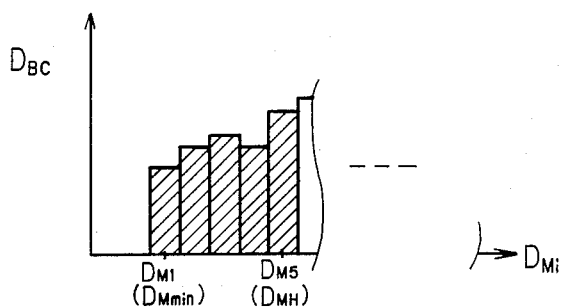

Suppose that an original is a transparent copy and is seen greenish on a light table to the naked eye. In other words, the original transmits more green light than an ordinary original. By performing the steps S11 through S16, histograms shown in FIGS. 7A through 7C, which correspond to FIGS. 6A through 6C, are obtained for the greenish original. In general, the more an original transmits light, the lower its density becomes. Because the greenish original transmits more green light than red and blue light, the density of the component G becomes lower than those of the components R and B. Therefore, the cumulative density $D_{GC}$ of the component G is also lower than the cumulative density values $D_{RC}$ and $D_{BC}$ as shown in FIGS. 7A through 7C. In FIGS. 7A through 7C, the minimum density $D_{Mmin}$ is equal to $D_{M1}$ and the temporary highlight density $D_{MH}$ is equal to $D_{MS}$. Those histograms do not show the rectangles whose class density $D_M$ exceeds the temporary shadow density $D_{MH}$ for convenience of illustration. Because the highlight point on the gradation correction curve is more important than the shadow point in processing an original covered with color fog, the first procedure will be explained as to the highlight color density.

The highlight color densities $D_{RH}$, $D_{GH}$, and $D_{BH}$ obtained at the step S16 on the basis of the histograms of FIGS. 7A through 7C have the following relations: $D_{GH}<D_{RH}$, $D_{GH}<D_{BH}$. This is because the cumulative density $D_{GC}$ is lower than the cumulative density values $D_{RC}$ and $D_{BC}$ as shown in FIGS. 7A through 7C. Now suppose that $D_{RH}=D_{BH}$, in order to simplify the situation. Gradation correction curves (or gradation correction lines) for respective color components are established with the highlight color density values $D_{RH}$, $D_{GH}$ and $D_{BH}$, separately.

Figure 8:
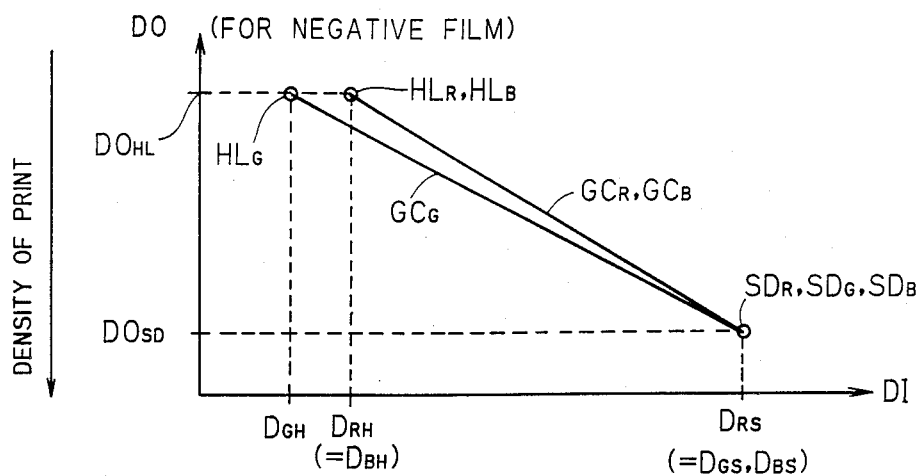
FIGS. 8 and 9 are graphs showing gradation correction curves.

FIG. 8 is a graph showing the gradation correction curves for recording color separation negatives according to the first procedure described above. The axis of abscissa of the graph is original density DI which is given with respect to each color component. The axis of ordinate of the graph is reproduction density DO. Highlight points $HL_R$, $HL_G$ and $HL_B$ for the color components R, G and B have respective coordinates ($D_{RH}$, $DO_{HL}$), ($D_{GH}$, $DO_{HL}$) and ($D_{BH}$, $DO_{HL}$). In other words, the reproduction shadow density $DO_{HL}$ is applied commonly to all the highlight points $HL_R$, $HL_G$ and $HL_B$. Reproduction shadow density $DO_{SD}$ is also applied commonly to all shadow points $SD_R$, $SD_G$ and $SD_B$. In FIG. 8, original shadow density values (or shadow color density values $D_{RS}$, $D_{GS}$ and $D_{BS}$ are assumed to be equal to each other for convenience of illustration. A gradation correction curve $GC_R$, for example, is defined to be a straight line drawn through the highlight point $HL_R$ and the shadow point $SD_R$. Instead the gradation correction curve $GC_R$ may be a curve of a prescribed shape, specified by a polynominal for example.

Because the original highlight density $D_{GH}$ is less than the original highlight density values $D_{RH}$ and $D_{BH}$, the gradation correction curve $GC_G$ for the color component G is positioned at the left hand side and the lower side of the gradation correction curves $GC_R$ and $GC_B$ for the color components R and B. When a same original density DI is given for all the color components, the reproduction density DO of the color component G is closer to the reproduction shadow density $DO_{SD}$ than the reproduction density DO of the color components R and B. Because the axis of the reproduction a density DO is defined for a negative film, density closer to the reproduction shadow density $DO_{SD}$ means higher density in a print (or a reproduced image). According to the gradation correction curves $GC_R$, $GC_G$ and $GC_B$, the color component G within the reproduction density values is relatively increased, whereby shortage of the color component G in the original density values as shown in FIGS. 7A through 7C is compensated. Consequently, a color fog over the original image can be eliminated.

The gradation correction curves $GC_R$, $GC_G$ and $GC_B$ are memorized in the LUT 33 in the form of a look-up table. At first, standard gradation correction curve is stored in the LUT 33 shown in FIG. 1B After the original highlight density values (or highlight color density values $D_{RH}$, $D_{GH}$ and $D_{BH}$ and the original shadow density values (or shadow color density values) $D_{RS}$, $D_{GS}$ and $D_{BS}$ are obtained in the reference point-setting unit 400 according to the first procedure, the density parameter signal DPS representing the coordinates of the highlight and shadow points is supplied from the reference point-setting unit 400 to the LUT 33. The standard gradation correction curve is converted into the gradation correction curves $GC_R$, $GC_G$ and $GC_B$ according to the values represented by the density parameter signal DPS. In FIG. 1B, the uncorrected digital density signal DDS represents the original density DI and the normalized density signal NDS represents the reproduction density DO.

A second procedure for setting up the gradation correction curves is suitable for processing an original which does not include an apparent shadow area, such as an original depicting white clouds in a blue sky. In the second procedure, the largest value among the shadow color density values $D_{RS}$, $D_{GS}$ and $D_{BS}$ is first selected. The selected largest value is commonly applied to the shadow points $SD_R$, $SD_G$ and $SD_B$. When the color tone of an original is mainly of sky blue, the shadow color density $D_{RS}$ of the color component R, which corresponds to a complimentary color of the sky blue, has the largest value.

Figure 9:
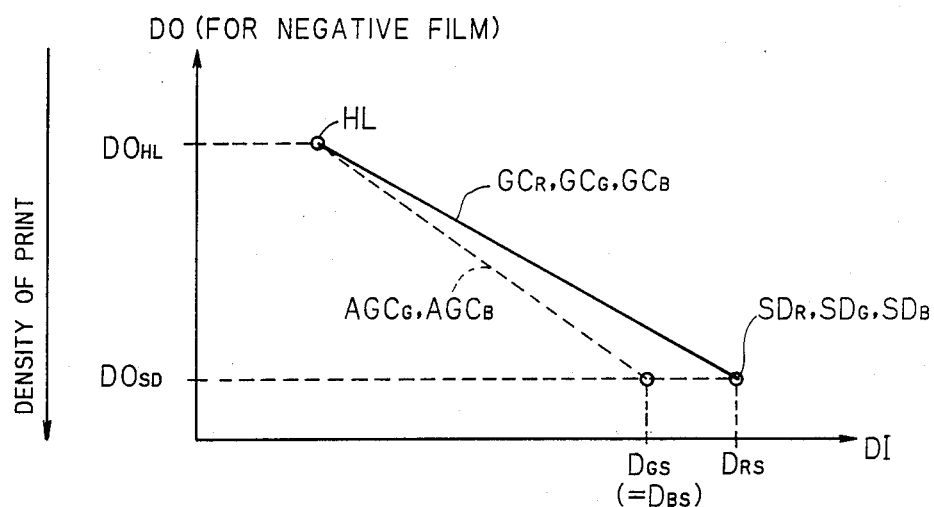

FIG. 9 is a graph showing the gradation correction curves according to the second procedure, where the shadow color density $D_{RS}$ has the largest value. In FIG. 9, the highlight point HL is assumed to be common to all the color components for convenience of illustration. In addition, the shadow color density values $D_{GS}$ and $D_{BS}$ are assumed to be equal to each other. Shadow points $SD_R$, $SD_G$ and $SD_B$ are located at the same position specified by coordinates $D_{RS}$, $DO_{SD}$. Therefore, gradation correction curves $GC_R$, $GC_G$ and $GC_B$ are represented by a single line drawn through the highlight point HL and the shadow point $SD_R$. FIG. 9 also illustrates imaginary gradation correction curves $AGC_G$ and $AGC_B$ represented by a broken line drawn through the highlight point HL and a point of coordinates $D_{GS}$, $DO_{SD}$. Because the shadow points $SD_R$, $SD_G$ and $SD_B$ are specified with the largest value among the shadow color densities $D_{RS}$, $D_{GS}$ and $D_{BS}$, the gradation correction curves $GC_R$, $GC_G$ and $GC_B$ are positioned at the upper side of the imaginary gradation correction curves $AGC_G$ and $AGC_B$. Therefore, the gradation correction curves $GC_G$ and $GC_B$ give a lower reproduction density DO for a given original density DI than the imaginary gradation correction curve $AGC_G$ and $AGC_B$, thereby preventing a reproduced image from getting darker. According to the gradation correction curves $GC_R$, $GC_G$ and $GC_B$, an original can be reproduced while the brightness and the main color tone of the original is maintained.

A third procedure for setting up the gradation correction curves is suitable for processing an original that does not include an apparent highlight area, such as an original consisting of primary colors. In the third procedure, the smallest value among the highlight color density values $D_{RH}$, $D_{GH}$ and $D_{BH}$ is first selected. The selected smallest value is applied commonly to the highlight points $HL_R$, $HL_G$ and $HL_B$. According to the third procedure, similarly to the second procedure, an original can be reproduced while the brightness of the main color tone of the original is reproduced.

The present invention may be applied only for establishing the highlight points, or the shadow points.

The present invention can be applied not only to a color scanner but also to an apparatus having tone reproducibility, such as a copy machine and facsimile terminal equipment. For thOse apparatuses, the highlight point and the shadow point are generally defined on a coordinate plane having a coordinate axis of density on the original image and density on the reproduced image.

When image data representing an original image are stored in a memory of large capacity in advance, the preliminary scanning of the original image for preparing the histograms can be omitted. Instead the image data are read out from the memory to prepare the histograms.

According to the present invention, highlight and shadow points on a gradation correction curve can be easily established while compensating for decoloration and color fog of an original.

Although the present invention has been described and illustrated in detail, it is clearly understood that the same is by way of illustration and example only and is not to be taken by way of limitation. The spirit and scope of the present invention should thus be limited only by the terms of the appended claims.

What is claimed is:

1. A method of establishing a reference point on a gradation correction curve employed in gradation correction of image data, said method comprising the steps of:

(a) preparing image data representing density values of a plurality of basic colors with respect to each pixel in an original;
   (b) averaging said density values of respective basic colors with respect to each pixel to obtain an average density $D_M$ of each pixel;
   (c) generating a histogram representing average density distribution in the form of a relation between said average density $D_M$ and a number of pixels $N_p$;
   (d) generating a cumulative histogram representing said average density distribution in the form of a relation between said average density $D_M$ and a cumulative number of pixels RN;
   (e) finding a reference average density $D_{Mrf}$ corresponding to a prescribed value of a reference cumulative number of pixels $RN_{rf}$ on said cumulative histogram;
   (f) selecting one of two terminal density values $D_{Mn}$ at which said cumulative histogram saturates and which is closer to said reference average density;
   (g) finding a set of pixels having said average density in a range essentially between said reference average density $D_{Mrf}$ and a selected terminal density value $D_{Mm}$;
   (h) averaging said density values of said plurality of basic colors for said set of pixels with respect to each of said plurality of basic colors, to thereby obtain reference color density values $D_{rf}$ for respective basic colors; and
   (i) establishing said reference point on the basis of said reference color density values $D_{rf}$.

2. A method in accordance with claim 1, wherein:
said gradation correction curve is defined on a coordinate plane whose first coordinate represents a first density DI before gradation correction and whose second coordinate represents a second density DO after gradation correction; and
said gradation correction curve is drawn through said reference point specified with one of said reference color density values $D_{rf}$ as said first coordinate and a prescribed value $DO_{rf}$ as said second coordinate.

3. A method in accordance with claim 2, wherein said gradation correction curve is generated for each of said plurality of basic colors.

4. A method in accordance with claim 3, wherein said plurality of basic colors essentially consist of primary colors.

5. A method in accordance with claim 4, wherein:
said reference point is either of a highlight point or a shadow point; and
at least one of said highlight point and said shadow point is established by said steps (a) through (i).

6. A method in accordance with claim 5, wherein said reference point for each of said plurality of basic colors is specified with one of said reference color density values $D_{rf}$ for a corresponding color as said first coordinate.

7. A method in accordance with claim 5, wherein said reference point for each of said plurality of basic colors is specified with the largest value among said reference color density values $D_{rf}$ as said first coordinate.

8. A method in accordance with claim 5, wherein said reference point for each of said plurality of basic colors is specified with the smallest value among said reference color density values $D_{rf}$ as said first coordinate.

9. An apparatus for establishing a reference point on a gradation correction curve employed in gradation correction of image data, said apparatus comprising:

(a) means for preparing image data representing density values of a plurality of basic colors with respect to each pixel in an original;
   (b) means for averaging said density values of respective basic colors with respect to each pixel to obtain an average density $D_M$ of each pixel;
   (c) means for generating a histogram representing average density distribution in the form of a relation between said average density $D_M$ and a number of pixels Np;

(d) means for generating a cumulative histogram representing said average density in the form of a relation between said average density $D_M$ and a cumulative number of pixels RN;

(e) means for finding a reference average density $D_{Mrf}$ corresponding to a prescribed value of a reference cumulative number of pixels $RN_{rf}$ on said cumulative histogram;

(f) means for selecting one of two terminal density values $D_{Mm}$ at which said cumulative histogram saturates and which is closer to said reference average density;

(g) means for finding a set of pixels having said average density in a range essentially between said reference average density $D_{Mrf}$ and a selected terminal density value $D_{Mm}$;

(h) means for averaging said density values of said plurality of basic colors for said set of pixels with respect to each of said plurality of basic colors to thereby obtain reference color density values $D_{rf}$ for respective basic colors; and (i) means for establishing said reference point on the basis of said reference color density values $D_{rf}$.

10. An apparatus in accordance with claim 9, wherein:
said gradation correction curve is defined on a coordinate plane whose first coordinate represents a first density DI before gradation correction and whose second coordinate represents a second density DO after gradation correction; and
said gradation correction curve is drawn through said reference point specified with one of said reference color density values $D_{rf}$ as said first coordinate and a prescribed value $DO_{rf}$ as said second coordinate.

11. An apparatus in accordance with claim wherein said gradation correction curve is generated for each of said plurality of basic colors.

12. An apparatus in accordance with claim 11, wherein said plurality of basic colors essentially consist of primary colors.

13. An apparatus in accordance with claim 12, wherein said reference point for each of said plurality of basic colors is specified with one of said reference color density values $D_{rf}$ for a corresponding color as said first coordinate.

14. An apparatus in accordance with claim 12, wherein said reference point for each of said plurality of basic colors is specified with the largest value among said reference color density values $D_{rf}$ as said first coordinate.

15. An apparatus in accordance with claim 12, wherein said reference point of each of said plurality of basic colors is specified with the smallest value among said reference color density values $D_{rf}$ as said first coordinate.

* * * * *